J. W. HENTZ.
TRANSFER.
APPLICATION FILED DEC. 20, 1907.

904,778.

Patented Nov. 24, 1908.

UNITED STATES PATENT OFFICE.

JAMES W. HENTZ, OF BALTIMORE, MARYLAND.

TRANSFER.

No. 904,778.         Specification of Letters Patent.         Patented Nov. 24, 1908.

Application filed December 20, 1907. Serial No. 407,334.

*To all whom it may concern:*

Be it known that I, JAMES W. HENTZ, a citizen of the United States, residing at Baltimore, in the State of Maryland, have invented certain new and useful Improvements in Transfers, of which the following is a specification.

This invention relates to improvements in transfers for street railways.

The object of the invention is to provide a transfer on which is indicated the time of leaving a given point and the time within which the transfer may be used at any transfer point along the line, without punching the same.

In the accompanying drawing I have shown a plan view of my transfer, omitting a number of the transfer points.

Referring to the accompanying drawing 1 designates the body of the transfer having a space 2 in which may be arranged the name of the railway company. In the space 3 is printed the time the car leaves one end of the line and the direction in which it is bound. Along the body of the transfer are a number of spaces 4 in which are printed the different transfer points, the direction in which the transfer is good, and the time within which the transfer must be used at each transfer point. In one corner of the transfer is printed two rows 5 and 6 of figures which indicate the time which the car may be back of its schedule time. For instance should the car leave one end of the line at 1.45, as indicated on the drawing, and be delayed for 20 minutes, the conductor would punch "20" in the row 5 which should be added to the time limit opposite the transfer point at which the transfer is to be used. The figures in the row 5 indicate up to sixty minutes and should the car be more than sixty minutes back of its schedule time this would be indicated by a punch in the second row 6, that is, a punch at "40" in the second row 6 would indicate that the car was one hour and forty minutes back of its time and this should be added to the time limit indicated at the transfer point. Thus it will be seen that when the car is on time no punching of the transfer is necessary as the time limit at each transfer point is clearly indicated.

Having thus described my invention what I claim is:

1. A transfer having thereon the time of leaving a given point, the transfer points passed, figures opposite each transfer point, and matter on the transfer indicating that the said figures designate the time after which the transfer is not good at said transfer points.

2. A transfer having thereon the time of leaving a given point, the transfer points passed, figures opposite each transfer point, matter on the transfer indicating that the said figures designate the time after which the transfer is not good at said transfer points, figures at one corner of the transfer, and matter on the transfer indicating that the said figures designate how much the car is back of its schedule.

In testimony whereof I affix my signature in presence of two witnesses.

JAMES W. HENTZ.

Witnesses:
CHAPIN A. FERGUSON,
ROBERT C. RHODES.